US009413935B2

(12) United States Patent
Halliday (10) Patent No.: US 9,413,935 B2
(45) Date of Patent: Aug. 9, 2016

(54) CAMERA MODULE, METHOD OF ASSEMBLY AND IMAGING DEVICE

(71) Applicant: STMicroelectronics (Research & Development) Limited, Marlow (GB)

(72) Inventor: William Halliday, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 115 days.

(21) Appl. No.: 13/861,742

(22) Filed: Apr. 12, 2013

(65) Prior Publication Data

US 2013/0271649 A1      Oct. 17, 2013

(30) Foreign Application Priority Data

Apr. 17, 2012   (GB) .................................. 1206686.6

(51) Int. Cl.
*H04N 5/225* (2006.01)

(52) U.S. Cl.
CPC ......... *H04N 5/2254* (2013.01); *Y10T 29/49002* (2015.01)

(58) Field of Classification Search
CPC . H04M 1/0264; H04N 5/2253; H04N 5/2254; H04N 5/2257; H01L 27/14618; G02B 13/001–13/009
USPC .................................. 348/294, 335, 340, 374
See application file for complete search history.

(56) References Cited

U.S. PATENT DOCUMENTS

| 2008/0055438 | A1* | 3/2008 | Lee et al. ....................... 348/294 |
| 2009/0057544 | A1* | 3/2009 | Brodie et al. .................. 250/239 |
| 2009/0180013 | A1* | 7/2009 | Kinoshita ....................... 348/308 |
| 2010/0033608 | A1  | 2/2010 | Chul |
| 2010/0141825 | A1* | 6/2010 | Kim et al. ....................... 348/340 |
| 2012/0276951 | A1* | 11/2012 | Webster et al. ............. 455/556.1 |

FOREIGN PATENT DOCUMENTS

KR   10-2009-0060764 A   6/2009

* cited by examiner

*Primary Examiner* — Paul Berardesca
(74) *Attorney, Agent, or Firm* — Seed Intellectual Property Law Group PLLC (57) ABSTRACT

A camera module has a lens module mounted on a substrate. The image sensor is located in a cavity in the substrate and is connected to the substrate by a bridge member, the infra-red filter. The image sensor is attached to the infra-red filter by a ring of adhesive surrounding the imaging area of the image sensor. The adhesive attaching the image sensor to the infrared filter comprises spacers. The infra-red filter is attached to the substrate by adhesive. The cavity may extend through the substrate. The image sensor is further connected to the substrate by a sheet member, which may be made of metal. The sheet member is affixed to the bottom of the substrate and covers the hole in the substrate formed by the extension of the cavity through the substrate. A method of assembly of the camera module includes: providing a substrate with a cavity; locating the image sensor in the cavity; connecting the infrared filter to the image sensor and the substrate; and mounting the lens module on the substrate.

25 Claims, 6 Drawing Sheets

CAMERA MODULE, METHOD OF ASSEMBLY AND IMAGING DEVICE

BACKGROUND

1. Technical Field

The present disclosure relates to camera modules, methods of assembly of camera modules and imaging devices, in particular relating to camera modules with the image sensor in a cavity in a substrate, such as a printed circuit board.

2. Description of the Related Art

Camera modules, such as those used in mobile phone handsets, have a lens module mounted above an image sensor. The focal plane is at the surface of the image sensor and is known as the image plane.

One of the key criteria of optical design is the Effective Focal Length (EFL) of a lens system. In a camera modules, the EFL is the distance from principal plane of the outer lens to the image plane. Related to EFL is the Total Track Length (TTL), which is the distance from the center of the outer lens to the image plane.

Broadly speaking, the greater the EFL or TTL the better the lens design that can be made. Therefore, every effort is made to place the image plane of the sensor at the lowest possible position in a module (oriented with the lens at the top) to maximize the space available for the lens such that the lens characteristics can be optimized with the longest EFL (or TTL).

Figure 1:
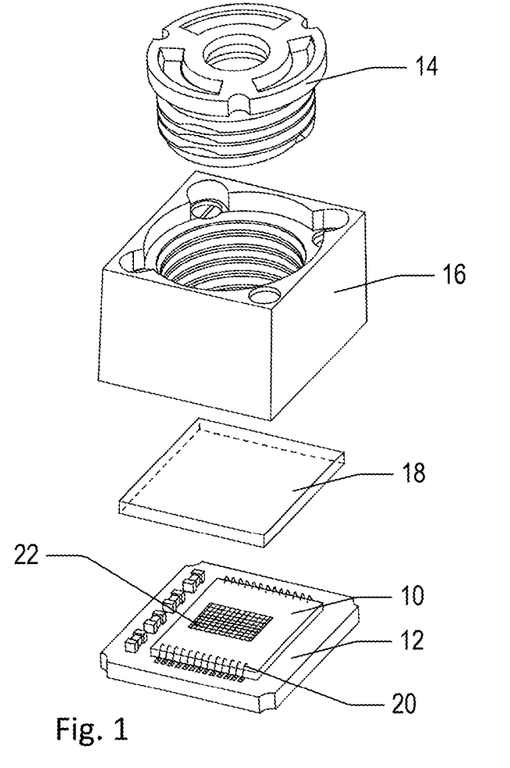
FIG. 1 illustrates an exploded view of a typical camera module.

One approach that has been used in camera module construction is shown in FIG. 1 where the image sensor 10 is placed on top of a printed circuit board (PCB) 12 (herein referred to as a substrate) and is surmounted by a lens module 14 screwed into a mount 16 with an infra-red filter 18 (typically a specially coated glass tile). Bond wires 20 are also shown electrically connecting the image sensor to the substrate.

Figure 2:
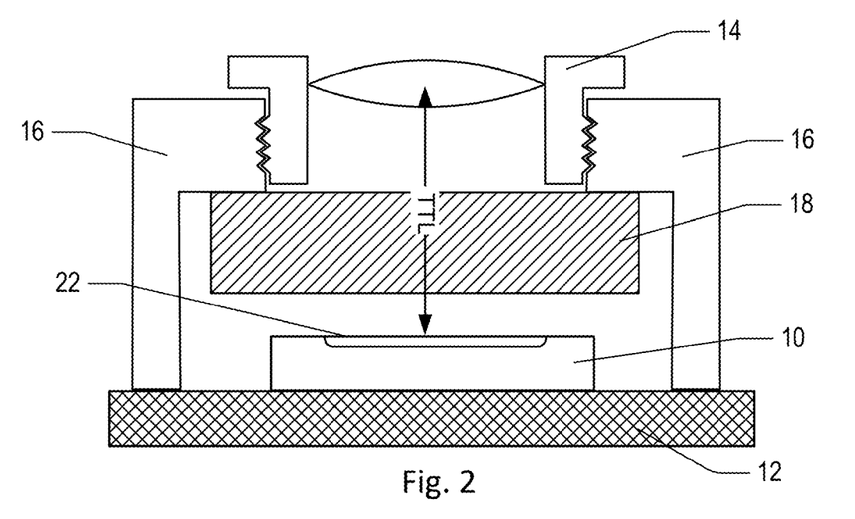
FIG. 2 illustrates a cross-section of an assembled typical camera module.

FIG. 2 shows the assembled camera module of FIG. 1. The vertical scale is exaggerated, particularly at the lower end of the mount 16 and for the infra-red filter 18 and image sensor 10. The image sensor 10 is placed on and attached to the substrate 12. The image sensor has an imaging area (e.g., a pixel array) 22, illustrated here as having some volume extending from the surface into the image sensor. The mount 16 is attached to the substrate 12 and the infra-red filter is attached to the mount 16.

In this construction, the EFL (or TTL) is limited by the distance between the top of the camera module and the top of the image plane (upper surface of the sensor). If the height of the image plane could be lowered, then there would be more room for the lens, the EFL (or TTL) of the lens could be increased resulting in improved optical performance.

Typically camera modules using a construction as shown in FIGS. 1 an 2 rely on minimizing both the sensor thickness and the substrate thickness to reduce image plane height. This may for example permit an image plane height of as low as 480 μm.

BRIEF SUMMARY

According to a first aspect, there is provided a camera module comprising:
  a lens module mounted on a substrate;
  a bridge member; and
  an image sensor connected to the substrate,
  wherein the image sensor is located in a cavity in the substrate and is connected to the substrate by the bridge member.

Preferably, the bridge member comprises an infra-red filter.

Preferably, the image sensor is connected to the bridge member by a seal surrounding an imaging area of the image sensor.

Preferably, the seal comprises a ring of adhesive.

Preferably, the ring of adhesive connecting the image sensor to the bridge member comprises one or more spacer.

Preferably, the bridge member is attached to the substrate by adhesive.

Preferably, the adhesive connecting the image sensor to the bridge member has a different hardness relative to adhesive attaching the bridge member to the substrate.

Preferably, the cavity extends through the substrate.

Preferably, the image sensor is further connected to the substrate by a sheet member.

Preferably, the sheet member is affixed to an opposite side of the substrate in relation to the bridge member.

Preferably, the sheet member covers a hole in the substrate formed by the extension of the cavity through the substrate.

According to a second aspect, there is provided a method of assembly of a camera module, the method comprising the steps:
  providing a substrate with a cavity;
  locating an image sensor in the cavity;
  connecting a bridge member to the image sensor and the substrate; and
  mounting a lens module on the substrate.

Preferably, the bridge member comprises an infra-red filter.

Preferably, the image sensor is connected to the bridge member by a seal surrounding an imaging area of the image sensor.

Preferably, the seal comprises a ring of adhesive.

Preferably, the method comprises providing the ring of adhesive connecting the image sensor to the bridge member with one or more spacer.

Preferably, the bridge member is attached to the substrate by adhesive.

Preferably, the method comprises connecting the image sensor to the bridge member using adhesive with a different hardness relative to adhesive used to attach the bridge member to the substrate.

Preferably, the method comprises providing the cavity extending through the substrate.

Preferably, the method further comprises the step of connecting the image sensor to the substrate by a sheet member.

Preferably, the method further comprises the step of affixing the sheet member to an opposite side of the substrate in relation to the bridge member.

Preferably, the method further comprises the step of covering a hole in the substrate formed by the extension of the cavity through the substrate with the sheet member.

According to a third aspect, there is provided an imaging device comprising a camera module according to the first aspect.

Preferably, the camera module is supported by a housing of a camera.

Preferably, the camera module is supported by a housing of a mobile telephone.

Preferably, the camera module is supported by a housing of a mouse.

BRIEF DESCRIPTION OF THE SEVERAL VIEWS OF THE DRAWINGS

Embodiments will now be described, by way of example only, with reference to the accompanying drawings, in which.

DETAILED DESCRIPTION

Embodiments increase the available distance for the lens by lowering the image plane height (IPH) of the camera module while maintaining the mechanical integrity of the camera module.

Other designs might place the sensor in a cavity in the substrate to lower the image height. In that case the sensor and the bottom of the substrate might go as low as 380 μm. However further reductions in EFL would require substantial changes to materials or a new design construction to be adopted as otherwise the camera module would be so weakened as to be unable to withstand the rigors of the assembly process or the reliability process for which the module is required to survive. Even careful handling could result in failure due to damage of the sensor.

An embodiment achieves a lower image plane height by creating a cavity in the substrate and lowering the sensor into the cavity. The cavity in the preferred embodiment is a hole going all the way through the substrate. The approach of using such a cavity would not typically be desirable as the hole through the substrate reduces the strength of the substrate. Thickening the substrate would improve the strength but might make the substrate more prone to warpage during manufacture. Instead, the embodiment provides other features for improving the strength and rigidity and allows a thin substrate with the associated low likelihood of warpage as will be explained below.

In another embodiment, the cavity may not extend all the way through the substrate.

Figure 3:
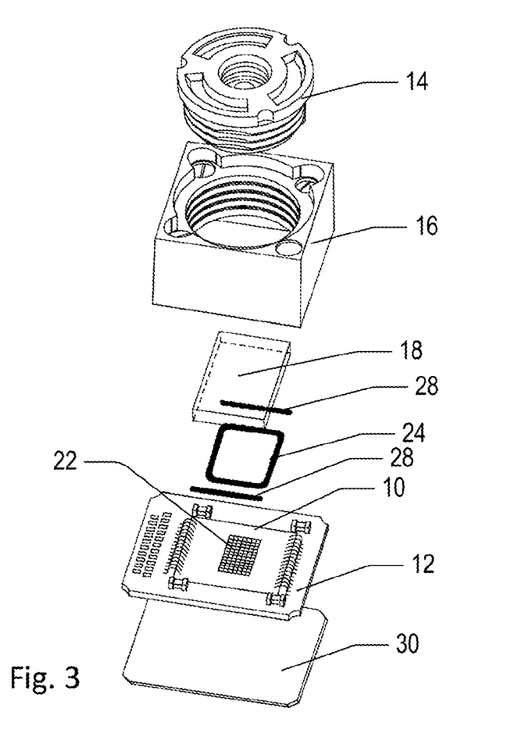
FIG. 3 illustrates an exploded view of a camera module in accordance with an embodiment.
Figure 4:
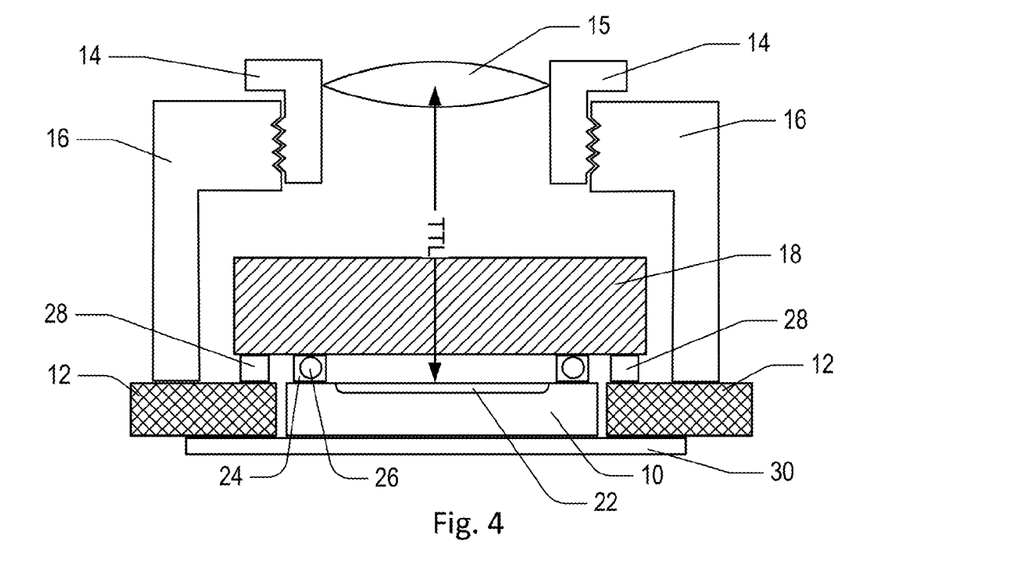
FIG. 4 illustrates a cross-section of an assembled camera module in accordance with an embodiment.

FIG. 3 illustrates an exploded view of a camera module in accordance with an embodiment. FIG. 4 illustrates a cross-section of the assembled camera module of FIG. 3. Features in common with FIGS. 1 and 2 are labeled with the same reference numbers.

With reference to FIGS. 3 and 4, the camera module has a lens module 14 comprising a lens 15 mounted on a substrate 12 via the mount 16. The image sensor 10 is located in a cavity in the substrate 12 and is connected to the substrate by the bridge member 18, in this example an infra-red filter. The bridge member 18 is between the lens 15 and the image sensor 10. In FIG. 4, the image sensor is in the cavity and the image sensor's upper surface is at the same level as the substrate upper surface. The image sensor may be in the cavity with its upper surface below the substrate upper surface. Alternatively, the image sensor may be in the cavity while protruding to some extent from the cavity, so that the image sensor's upper surface is above the level of the substrate upper surface. The image sensor 10 is connected to the infra-red filter 18 by a seal 24 surrounding the imaging area of the image sensor 22. In this example the seal 24 is a ring of adhesive attaching the image sensor 10 to the infra-red filter 18. The adhesive 24 attaching the image sensor to the infra-red filter comprises spacers 26. The infra-red filter 18 is attached to the substrate 12 by adhesive 28.

The adhesive 24 attaching the image sensor 10 to the infra-red filter 18 may have a different hardness relative to adhesive 28 attaching the infra-red filter 18 to the substrate 12.

In this embodiment the cavity extends through the substrate 12. The image sensor 10 is further connected to the substrate by a sheet member 30. The sheet 30 may be made of metal, but other materials may be used that provide tensile strength, light obstruction and/or thermal conductivity. The sheet member 30 is affixed to the bottom of the substrate 12 and covers the hole in the substrate 12 formed by the extension of the cavity through the substrate.

Figure 5:
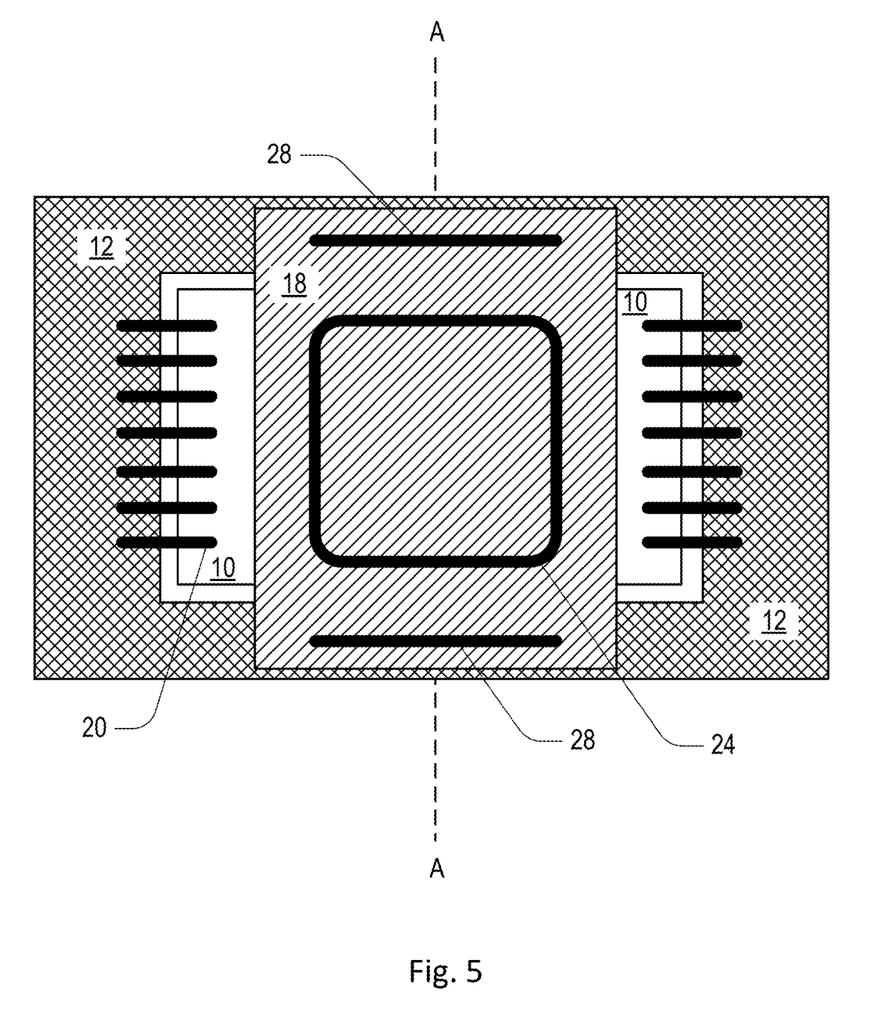
FIG. 5 illustrates a plan view of a part-assembled camera module in accordance with an embodiment.

FIG. 5 illustrates a plan view of a part-assembled camera module in accordance with the embodiment shown in FIGS. 3 and 4. Features in common with FIGS. 3 and 4 are labeled with the same reference numbers. FIG. 4 is a cross section along the line A-A shown in FIG. 5. The rectangular shape of the infra-red filter 18 has its long side aligned at right angles to the long side of the rectangular image sensor 10. This allows room for bond wires 20 to be attached to the ends of the image sensor 10 that protrude from under the infra-red filter 18.

The embodiments described herein use a sensor which is only bonded at two sides, but a similar approach can be envisaged where the sensor is embedded inside a substrate without wire-bonds such as fan-out wafer level packaging (FOWLP) or embedded wafer level packaging concepts (EWLP)

Rather than thickening the substrate the mechanical robustness of this embodiment is maintained by a number of features.

Firstly, the sensor and the substrate are mounted onto a metal sheet. This provides many effects:

1. The metal sheet provides a firm base upon which to assemble the substrate and the image sensor and is stiff enough to support the sensor during the wire-bonding process.

2. The sheet has excellent tensile strength and will stiffen the substrate without adding excessive height.

3. The sheet has a high thermal conductivity allowing heat to be extracted from the module.

4. The sheet blocks light photons that might otherwise leak into the module or even permeate through the very thin rear side of the sensor.

5. The sheet prevents dust ingress.

6. The sheet spreads the pressure applied to the bottom of the module over as large a surface area as possible.

The mechanical rigidity of the substrate/sensor is further enhanced by mounting the infra-red filter onto the top surface of the sensor and substrate as opposed to fitting it onto the lens mount. In this example the glass is bonded to the sensor using a ring of adhesive that surrounds the image array of the sensor and a bead of glue on the substrate on either side of the sensor. This gluing approach has the following effects:

1. The ring of adhesive glues the glass panel over much of the surface area of the sensor such that the glass panel acts to support the sensor, significantly improving the strength and rigidity.

2. The side beads firmly anchor the glass to the substrate providing tensile strength above the sensor in the same manner as the metal plate does underneath it.

3. The glue ring seals the image array from any foreign material that might otherwise land in the sensor surface and so be visible in the images taken with the sensor. This is important as any cavity design concept will have material shedding occur at the edges of the cavity during assembly and throughout the life of the camera module. Such foreign matter can be static or mobile.

In order to compensate for the tolerances of thickness in such a construction the glue used to bond the glass may be of two types. One may have spacers (beads of glass or other material infused into the glue that ensure it is compressed to a controlled thickness) while the other does not. The adhesive itself may be the same material.

In one embodiment, the spacer glue is applied to the sensor to form the glue ring and the non-spacer glue is applied to the substrate. This provides very good rigidity and ensures that any difference between the sensor thickness and the substrate thickness is accommodated.

In another configuration, one or other of the glues might be a semi-hard glue allowing the module to be less rigid and better able to withstand shock, but still providing a measure of mechanical strength to protect the sensor.

Figure 6:
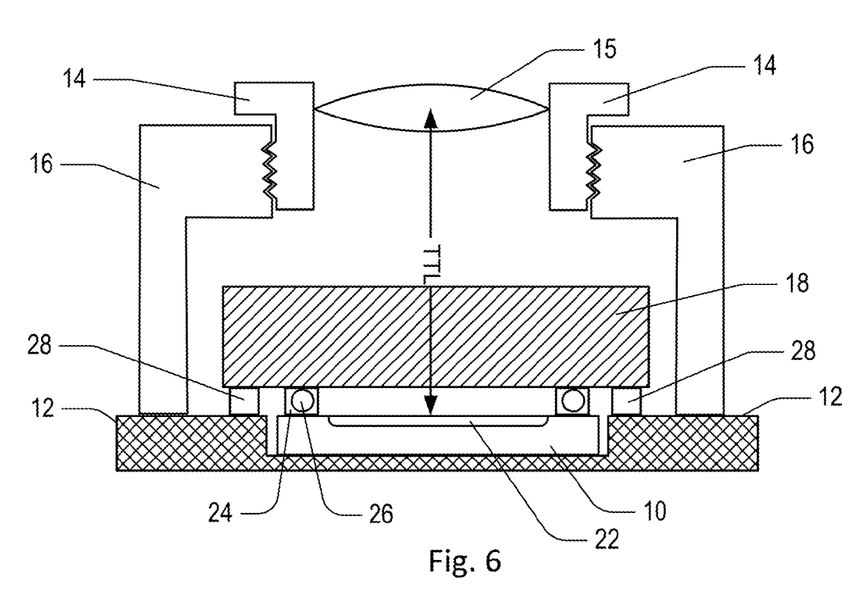
FIG. 6 illustrates a cross-section of an assembled camera module in accordance with another embodiment with the cavity not extending through the substrate.

FIG. 6 illustrates a cross-section of an assembled camera module in accordance with another embodiment of the present disclosure with the cavity not extending through the substrate. Features in common with FIG. 4 are labeled with the same reference numbers. A difference to FIG. 4 is that there is no metal sheet 30 and the image sensor 10 is seated on the base of the cavity. The substrate 12 may be a laminate, and the cavity formed by milling a cutout in the upper layer or layers of the laminate before lamination.

A significant benefit of at least some of the embodiments of the present disclosure is that the design is entirely consistent with existing high volume assembly equipment used for camera modules using conventional assembly techniques.

Figure 7:
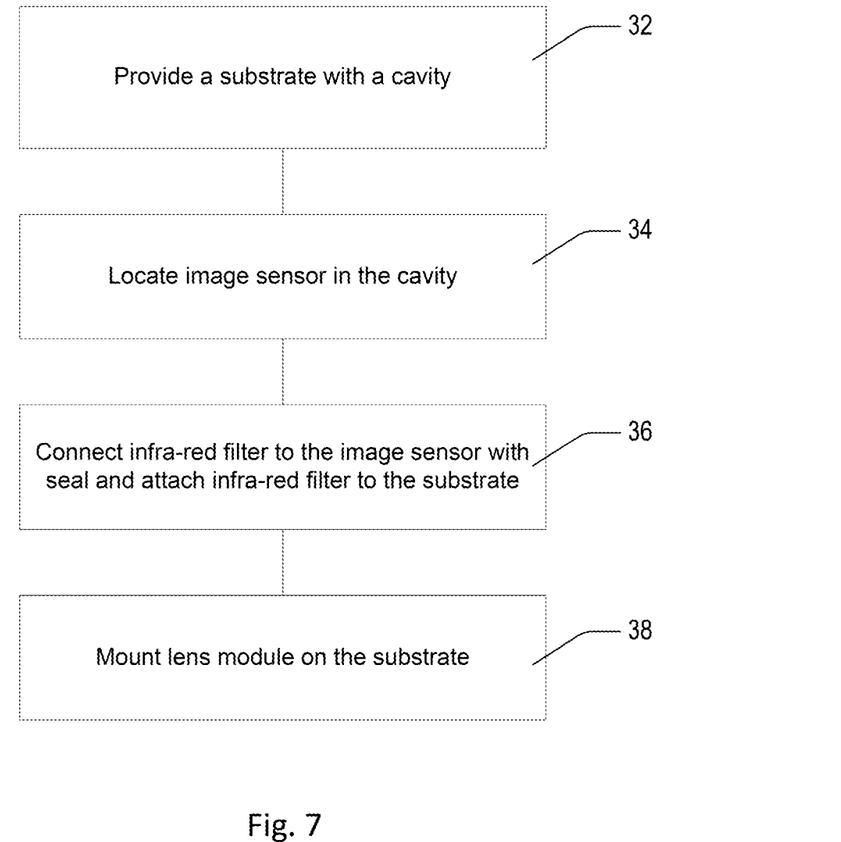
FIG. 7 is a flowchart of a method of assembly of a camera module according to an embodiment.

FIG. 7 is a flowchart of a method of assembly of a camera module according to an embodiment. With reference to FIG. 7, the method of assembly of a camera module has the following steps.

With reference to 32, the method includes providing a substrate with a cavity. The cavity may extend through the substrate.

With reference to 34, the method includes locating an image sensor in the cavity. The image sensor may be connected to the substrate by a sheet member, made for example of metal. The sheet member may be affixed to the opposite side of the substrate in relation to the infra-red filter. The sheet member may cover the hole in the substrate formed by the extension of the cavity through the substrate.

With reference to 36, the method includes connecting an infra-red filter to the image sensor and attaching the infra-red filter to the substrate. The image sensor is connected to the infra-red filter by a seal surrounding an imaging area of the image sensor, and in this example is attached by a ring of adhesive acting as the seal. The adhesive thus attaching the image sensor to the infra-red filter may be provided with spacers. The infra-red filter may be attached to the substrate by adhesive. The adhesive used to attach the image sensor to the infra-red filter may have a different hardness relative to the adhesive used to attach the infra-red filter to the substrate.

With reference to 38, the method includes mounting a lens module on the substrate.

It is to be appreciated that the steps of the method may be performed sequentially, in parallel, omitted or in an order different from the order that is illustrated.

This method of camera module construction does not require significant investment in new equipment, materials or processes.

Figure 8:
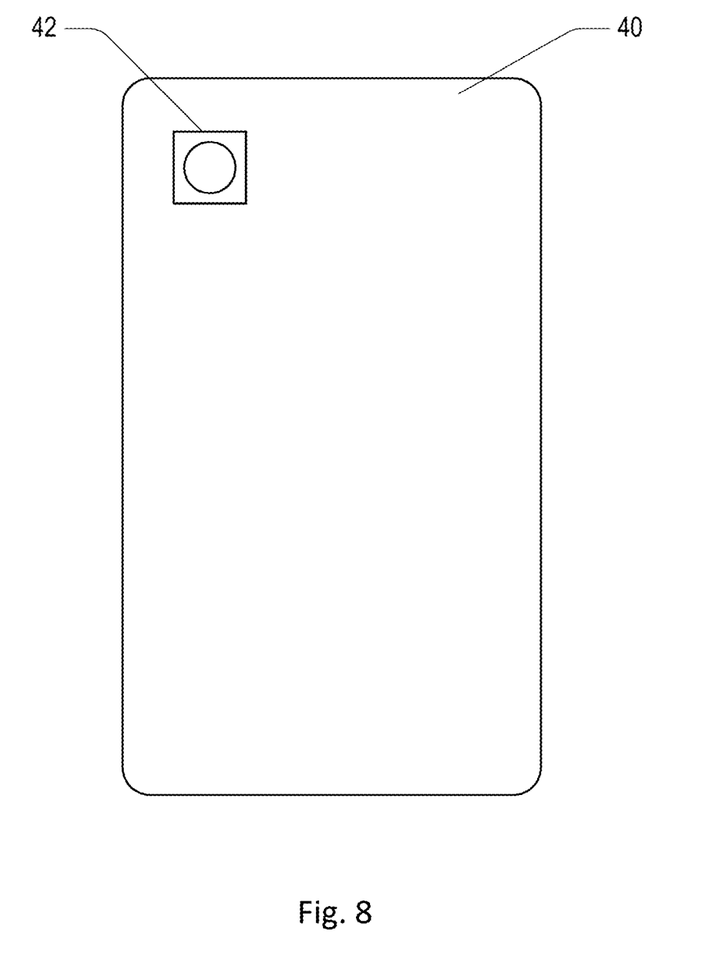
FIG. 8 shows an imaging device according to an embodiment.

FIG. 8 shows an embodiment which is an imaging device 40. The imaging device 40 has a camera module as described with reference to FIGS. 3 to 6 above.

Depending on the respective application, the camera module may be supported by a housing of, for example, a camera, a mobile telephone 40 (as shown in FIG. 8), or a mouse.

While this detailed description has set forth some embodiments of the present disclosure, the appended claims cover other embodiments of the present disclosure which differ from the described embodiments according to various modifications and improvements. For example, a back-illuminated image sensor may be used in which case the imaging area would not have pixels, but would still benefit from being protected from foreign matter by the seal. Instead of or in addition to adhesive, other sealing material, such as an O ring, may be used as the seal to attach the image sensor to the infra-red filter. In such a case with adhesive, the O ring would be in effect a spacer.

Within the appended claims, unless the specific term "means for" or "step for" is used within a given claim, it is not intended that the claim be interpreted under 35 U.S.C. 112, paragraph 6.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A camera module, comprising:
a substrate having a cavity;
a lens module mounted on the substrate, the lens module including a lens;
an image sensor located in the cavity of the substrate and having opposing first and second image sensor ends and opposing third and fourth image sensor ends;
conductive elements electrically coupling the image sensor to the substrate;
a bridge member being integral and located between the lens and the image sensor and having opposing first and second bridge ends and opposing third and fourth bridge ends, the bridge being oriented with respect to the image sensor such that the first and second bridge ends extend beyond the third and fourth image sensor ends and at least a portion of the third and fourth bridge ends terminate over the image sensor, exposing the conductive elements; and
adhesive that couples the image sensor to the bridge member, the adhesive being distinct from the conductive elements.

2. The camera module of claim 1, wherein the bridge member comprises an infra-red filter.

3. The camera module of claim 1, wherein the adhesive is a ring of adhesive and forms a seal that secures the image sensor to the bridge member, wherein the seal surrounds an imaging area of the image sensor, the conductive elements being outward of the seal.

4. The camera module of claim 1, further comprising one or more spacers that together with the adhesive form a seal that secures the image sensor to the bridge member and surrounds an imaging area of the image sensor.

5. The camera module of claim 1, wherein the adhesive is a first adhesive, the camera module comprising a second adhesive that secures the bridge member to the substrate.

6. The camera module of claim 5, wherein the first adhesive securing the image sensor to the bridge member has a different hardness than the second adhesive securing the bridge member to the substrate.

7. The camera module of claim 1, wherein the cavity extends through the substrate.

8. The camera module of claim 7, further comprising a sheet member, wherein the image sensor is further secured to the substrate by the sheet member.

9. The camera module of claim 8, wherein the sheet member is affixed to an opposite side of the substrate in relation to the bridge member.

10. The camera module of claim 9, wherein the sheet member covers the cavity that extends through the substrate.

11. A method of assembling a camera module, the method comprising:
providing a substrate with a cavity;
placing an image sensor in the cavity, the image sensor having opposing first and second image sensor ends and opposing third and fourth image sensor ends;
orientating an integral bridge member with respect to the image sensor such that first and second opposing bridge ends extend beyond the third and fourth image sensor ends and at least a portion of third and fourth bridge ends terminate over the image sensor;
securing a bridge member to the image sensor and the substrate by an adhesive;
electrically coupling the image sensor to the substrate by conductive elements, wherein the conductive elements are outward of the adhesive, the adhesive being distinct from the conductive elements, and exposed by the bridge so that the conductive elements are laterally adjacent to the third and fourth bridge ends; and
mounting a lens module that includes a lens on the substrate with the bridge member between the lens and the image sensor.

12. The method of assembly of claim 11, wherein the bridge member comprises an infra-red filter.

13. The method of assembly of claim 11, wherein securing the bridge member to the image sensor comprises using the adhesive to form a seal located outwardly of an imaging area of the image sensor.

14. The method of assembly of claim 13, wherein the seal is a ring of the adhesive.

15. The method of assembly of claim 14, wherein the seal includes one or more spacers located inside of the adhesive.

16. The method of assembly of claim 14, wherein the adhesive is a first adhesive, wherein the bridge member is secured to the substrate by a second adhesive.

17. The method of assembly of claim 16, wherein the first adhesive has a different hardness than the second adhesive.

18. The method of assembly of claim 11, wherein the cavity extends through an entire thickness of the substrate.

19. The method of assembly of claim 18, further comprising securing the image sensor to the substrate by a sheet member.

20. The method of assembly of claim 19, wherein securing the image sensor to the substrate by a sheet member comprises securing the sheet member to an opposite side of the substrate in relation to the bridge member.

21. The method of assembly of claim 18, further comprising covering a hole in the substrate formed by the extension of the cavity through the entire thickness of the substrate with the sheet member.

22. An imaging device, comprising:
a camera module that includes:
a substrate having an upper surface and a cavity at the upper surface;
a lens module mounted to the upper surface of the substrate, the lens module including a lens;
conductive elements electrically coupling the image sensor to the substrate;
an image sensor having first and second opposing sides and being located in the cavity of the substrate, a first of the conductive elements coupling the image sensor to the substrate at the first side of the image sensor and a second of the conductive elements coupling the image sensor to the substrate at the second side of the image sensor;
a bridge member being integral and located between the lens and the image sensor the bridge member having first and second opposing ends and third and fourth opposing ends, the third and fourth opposing ends terminating over the image sensor, the first and second opposing ends extending beyond the image sensor and being secured to the substrate; and
an adhesive that secures the first and second ends of the bridge member to the substrate, the adhesive being distinct from the conductive elements.

23. The imaging device of claim 22, wherein the camera module is supported by a housing of a camera.

24. The imaging device of claim 22, wherein the camera module is supported by a housing of a mobile telephone.

25. The imaging device of claim 22, wherein the camera module is supported by a housing of a mouse.

* * * * *